July 30, 1968 — R. E. ELLIOTT — 3,394,731

CHECK VALVE HAVING IMPROVED VALVE SEAT

Filed Jan. 6, 1964

INVENTOR.
ROBERT E. ELLIOTT

BY
Head & Johnson
ATTORNEYS

United States Patent Office 3,394,731
Patented July 30, 1968

3,394,731
CHECK VALVE HAVING IMPROVED VALVE SEAT
Robert E. Elliott, Tulsa, Okla., assignor to Frank Wheatley Pump & Valve Manufacturer, Tulsa, Okla., a corporation of Oklahoma
Filed Jan. 6, 1964, Ser. No. 335,924
1 Claim. (Cl. 137—527.8)

This invention relates to improvements in valves. More particularly, the invention relates to improvements in the valve seat for check valves. Still more particularly, the invention relates to a check valve including the provision of a removable valve seat having characteristics of improved performance and economy of construction.

Every check valve requires the coaction of a moveable element, usually a ball or some type of pivoted clapper, sealing against a valve seat. The valve seats are usually machined directly in the valve body. The disadvantages of this arrangement are: (1) expense of manufacturing; (2) difficulty of accurately machining the valve seat relative to the clapper pivot post; (3) wear of the valve seat usually requires the whole valve be discarded; and (4) any wear on the valve seat requires the complete valve to be taken out of service for repair. To overcome this problem valve manufacturers have designed valve having threaded replaceable valve seats.

In larger sizes heavy duty industrial type valves replaceable seats have universally been of the type wherein they are externally threaded and held in the valve body by threads formed in the body. This procedure is successful, but is characterized by some disadvantages. First, the threading of a valve body, particularly if the valve is a large size, is extremely difficult. Not only is the threading within itself difficult but the actual alignment of the threads is an onerous problem. Second, after a valve is in service for a length of time the threads between the valve seat insert in the body of the valve tend to cohere so that removing the valve seat is extremely difficult.

To overcome these problems is the general and basic object of this invention. A more particular object of the invention is the provision of a removable valve seat which does not require threads formed within the body of the valve.

Another object of the invention is the provision of a removeable valve seat for a valve which is easily removeable and thereby adaptable for expeditious repair of the valve without requiring that the valve itself be taken into a shop.

Another object of this invention is to provide a removeable valve seat for a check valve having a gasket arrangement wherein as the fluid pressure in the valve increases the efficiency of the gasket to seal is proportionally increased.

Another object of this invention is to provide a removeable valve seat for a check valve including means wherein the gaskets serve as shims permitting easy field adjustment of the valve seat position to compensate for wear of the valve seat and to afford easy alignment of the face of a replacement seat relative to the clapper pivot post.

These and other objects of the invention will be shown and a better understanding of the invention will be had by referring to the following description and claims, taken in conjunction with the attached drawings in which:

This invention may be described as an improved removeable valve seat. More particularly, but not by way of limitation, the invention may be described as a valve comprising a body having a fluid passage therethrough, said fluid passage defined in part by an integral reduced internal diameter circumferential body seating flange, a removeable tubular valve seat received by said seating flange, the valve seat including an integral circular flange portion in a plane perpendicular to the tubular axis of said valve seat, said flange portion sealably engaging said body seating flange, said tubular valve seat extending rearwardly of said seating flange, said valve seat in the rearward portion thereof having a multiplicity of threaded spaced apart openings therein, a setscrew threaded into each of said openings, the inner end of each of said setscrews engaging, when said setscrew is in the threadably advanced position, said seating flange, and closure means in said valve body engageable in the closed position thereof with said valve seat.

Figure 1:
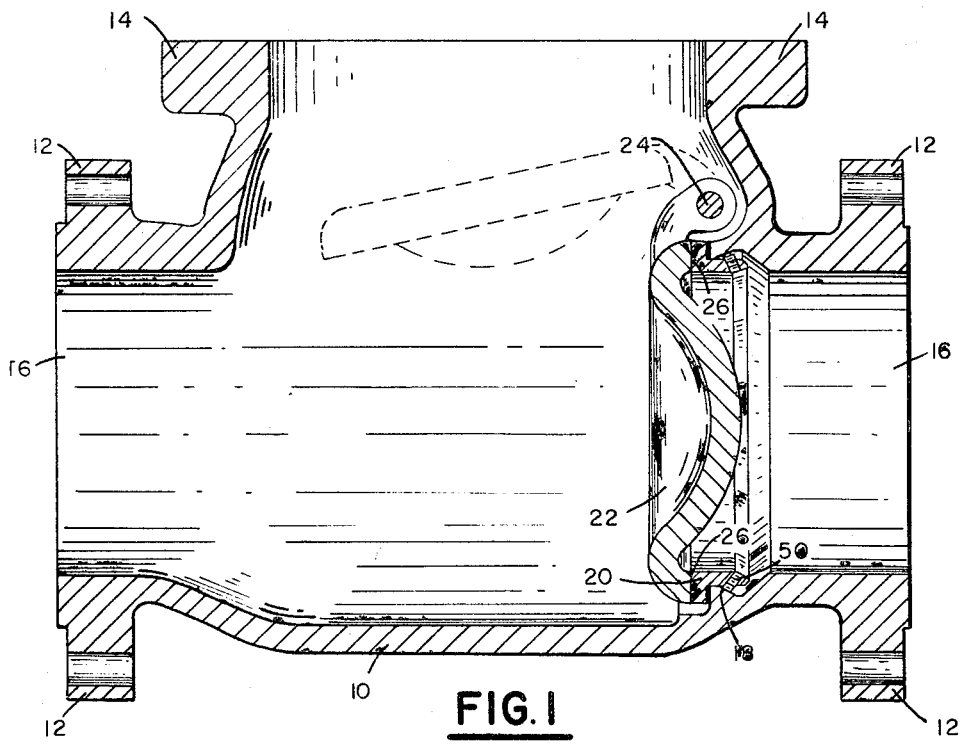
FIGURE 1 is a cross-sectional view of a check valve incorporating the removable valve seat of this invention.

Referring now to the drawings and first to FIGURE 1, a cross-sectional view of a typical check valve embodying the novel principles of this invention are shown. The valve consists of a body 10 having a flange 12 at each end thereof whereby the valve may be affixed to a pipeline or other equipment. Access to the interior of the valve is provided by an upper flange 14 which, when the valve is in operation, is closed by a cover (not shown).

A fluid passageway 16 is provided in valve body 10. The passageway 16 is defined in part by an integral reduced internal diameter circumferential body seating flange 18. A tubular removable valve seat 20 is received by the seating flange 18 and forms the seating surface whereby sealed closure of the valve is achieved.

The valve in FIGURE 1 is a typical check valve and is provided with a pivoted clapper 22 which swings in an arc about arm pin 24 which functions as a pivot post. Clapper 22 includes a circumferential planar seating face 26 which engages the valve seat 18.

When the valve is in the postion shown the valve is closed against the reverse flow of fluid through the valve. As fluid flow is caused in the opposite direction clapper 22 pivots to the dotted position allowing free passage of fluid through fluid passageway 16.

Figure 2:
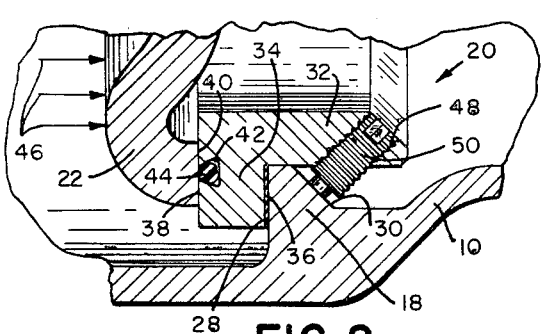
FIGURE 2 is an enlarged fragmentary view showing the details of construction of the removable valve seat of this invention.
Figure 3:
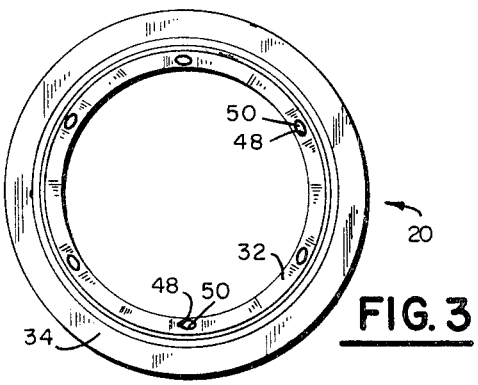
FIGURE 3 is an end view of the removeable valve seat of this invention.

Referring now to FIGURES 2 and 3 the details of construction of the improved valve seat of this invention are best shown. The body seating flange 18 has a forward surface 28 and a rearward surface 30. In the preferred embodiment the rearward surface 30 is in the shape defined as a truncated cone, that is, the cross section of the seating flange 18 shows the rearward surface 30 extending at an angle relative to the axis of the passageway of the valve. In addition, in the preferred embodiment the forward surface 28 is defined by a plane perpendicular the axis of the valve fluid passage.

Valve seat 20 is an integral element composed of two basic portions, that is, a tubular portion 32 which extends rearwardly past the rearward surface 30 of body seating flange 18, and an integral circular flange portion 34 which extends in a plane perpendicular to the tubular portion 32 at the forward end of the tubular portion.

Tubular portion 32 is of an external diameter to be slideably received by the body seating flange 18. Flange portion 34 of the valve seat 20 engages the forward surface 28 of body seating flange 18 to seal against fluid passage around the valve seat. To further improve the sealing engagement of these elements gasket 36 may be provided. In addition to providing improved sealing, gaskets 36 also function as a shim. Referring back to FIGURE 1 it can be seen that in order for the valve to function properly an accurate alignment of the valve seat 20 must be made relative to the arm pin 24 which supports clapper 22. This is accomplished by using greater or less thickness gasket or gaskets 36. Thus, a multiplicity of shim gaskets of different thicknesses may be utilized, the sum of whose thicknesses equal the desired total.

The forward face 38 of the valve seat 20 functions as the seating face, cooperating with seating face 40 of clapper 22. To further improve the sealing of faces 38 and 40, a groove 42 may be provided in forward face 38 of the valve seat 20 to receive an O-ring gasket 44. It can be seen that groove 42 and O-ring 44 can equally as well be placed in the seating face 40 of clapper 22.

As clapper 22 pivots to the closed position against valve seat 20 the reverse fluid pressure causing closure, indicated by the arrows 46, forces the valve seat 20 against body seating flange 18, tending to compress gaskets 36. Thus, the greater the fluid force, indicated by arrows 46, the greater sealing effect is obtained between the valve seat 20 and the body seating flange 18. In this manner, the effectiveness of sealing of the seating face itself compensating with fluid pressure.

Formed in the rearward area of the tubular portion 32 of valve seat 20 is a multiplicity of threaded openings 48 (only one of which is shown in FIGURE 2). Positioned in each of the threaded openings 48 is a setscrew 50 which is threadably advanced to engage rearward surface 30 of the body seating flange 18. In this manner the valve seat 20 is held firmly in its positions in the valve body.

In the preferred arrangement, as shown in FIGURE 2, wherein the rearward surface 30 of the body seating flange 18 is disposed, in cross-section, at an angle relative to the axis of the valve, the axis of openings 48 are preferably each alinged so as to intersect the surface 30 perpendicularly. Although this is the preferred embodiment it can be seen that various other configurations may be arranged whereby the setscrews 50 serve to retain the valve seat 20 in proper position. In addition, as previously noted, the reverse flow of fluid closing clapper 22 forces the valve seat 20 against body seat flange 18 so that the valve seat 20 is easily held in position.

Referring to FIGURE 3 the valve seat member 20 is shown in rear plan view. Obviously the threaded openings 48 may be spaced closer together or further apart as dictated by design requirements.

As illustrated in FIGURE 1, the angular positioning of setscrews 50 facilitate easy access thereto by the open end of the fluid passage 16.

Figure 4:
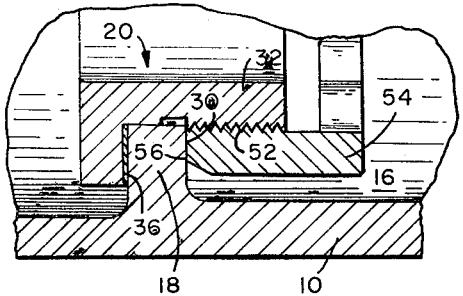
FIGURE 4 is an enlarged fragmentary view, equivalent to FIGURE 2, showing an alternate embodiment of the removeable valve seat of this invention.

Various other means of retaining the valve seat 20 in the valve in a nonthreaded engagement with valve body 10 will be suggested. As an example, FIGURE 4 illustrates and alternate embodiment. In this arrangement the external rearward portion of the tubular portion 32 of valve seat 20 is threaded at 52. To retain the valve seat 20 in proper position relative to the body seating flange 18 an internally threaded tubular follower member 54 is utilized. The forward end 56 of follower 54 engages the rearward surface 30 of body seating flange 18 to retain the valve seat 20 in proper position.

An apparent disadvantage of the arrangement of FIGURE 4 is that the fluid passageway 16 of the valve body 10 must be of sufficient internal diameter rearwardly of the body seating flange 18 to permit insertion and removal of follower 54. An advantage of the embodiment of FIGURE 4 however is that uniform force is applied against the valve seat 20 around the total circumference thereof to more uniformly force it against the body seating flange 18, so that uniform pressure is applied to gaskets 36.

In addition to the embodiments of FIGURE 2 and FIGURE 4 other embodiments will be suggested all within the purview of this invention.

Although this invention has been described with a certain degree of particularity it is manifest that many changes may be made in the details of construction and the arrangement of components without departing from the spirit and scope of this disclosure.

What is claimed:
1. A valve comprising:
   a body having a fluid passage defined in part by a integral reduced internal diameter circumferential body seating flange having a forward and rearward surface, the rearward surface being defined substantially by a truncated cone;
   a removable tubular valve seat received by said seating flange, said seat including an integral forward circular flange portion in a plane substantially perpendicular the tubular axis of said valve seat, said flange portion sealably engaging said body seating flange, said tubular valve seat in the rearward portion thereof having a multiplicity of threaded spaced apart openings therein, the axis of each of said threaded openings being disposed to intersect said rearward surface of said seating flange substantially perpendicularly thereto;
   a setscrew threaded into each of said openings, the inner end of each of said setscrews engaging, when said setscrew is in the threadably advanced position, said seating flange; and
   closure means in said valve body sealably engageable in the closed position thereof with said valve seat.

References Cited

UNITED STATES PATENTS

| | | | |
|---|---|---|---|
| 3,131,719 | 5/1964 | Englert | 251—362 X |
| 3,156,418 | 11/1964 | Jablonski | 285—404 X |
| 3,189,319 | 6/1965 | Bredtschneider | 251—362 X |

FOREIGN PATENTS

| | | |
|---|---|---|
| 11,186 | 1909 | Great Britain. |

ALAN COHAN, *Primary Examiner.*